United States Patent [19]

Nakanishi

[11] 4,429,883
[45] Feb. 7, 1984

[54] LABYRINTH SEAL CONSTRUCTION

[75] Inventor: Keiichi Nakanishi, Yokohama, Japan

[73] Assignee: Nissan Motor Co., Ltd., Yokohama, Japan

[21] Appl. No.: 294,386

[22] Filed: Aug. 19, 1981

Related U.S. Application Data

[63] Continuation of Ser. No. 141,971, Apr. 21, 1980, abandoned.

[30] Foreign Application Priority Data

May 8, 1979 [JP] Japan .............................. 54-60125[U]

[51] Int. Cl.³ ............................................ F01D 11/08
[52] U.S. Cl. ...................................... 277/53; 415/174
[58] Field of Search ................................... 277/53–57; 415/174

[56] References Cited

U.S. PATENT DOCUMENTS

| | | | |
|---|---|---|---|
| 3,146,992 | 9/1964 | Farrell | 277/26 |
| 3,392,910 | 7/1968 | Tanzberger | 277/53 |
| 3,411,794 | 11/1968 | Allen | 277/53 |
| 3,719,365 | 3/1973 | Emmerson et al. | 277/53 |
| 4,060,250 | 11/1977 | Davis et al. | 277/53 |
| 4,207,024 | 6/1980 | Bill | 415/174 |

Primary Examiner—Robert I. Smith

[57] ABSTRACT

A shock absorbing member or construction is equipped in a labyrinth seal construction to absorb shocks of collision of annular projections on an annular member against a cylindrical surface of a sleeve disposed in another annular member, so that undesired breakage of the tops of the annular projections and formation of deep streaks on the cylindrical surface of the sleeve are prevented.

3 Claims, 6 Drawing Figures

LABYRINTH SEAL CONSTRUCTION

This is a continuation, of application Ser. No. 141,971, filed Apr. 21, 1980 and now abandoned.

FIELD OF THE INVENTION

The present invention relates to a labyrinth seal construction commonly used for gas pipes, steam engines and turbines and more particularly to a labyrinth seal construction appropriate to dual-shaft type gas turbine engines which necessitate minimum-leakage seal.

BACKGROUND OF THE INVENTION

In a field of gas turbine engines or the like, it is a common practice to use a labyrinth seal construction at sections where a minimum-leakage seal is particularly necessitated. Some of the labyrinth seal constructions for them conventionally used, however, still have drawbacks because of their inherent constructions, as will be described at an item of prior art which is carried hereinafter.

SUMMARY OF THE INVENTION

According to the present invention, there is provided an improved labyrinth seal construction used in a device having a housing and a shaft which is rotatable about its axis relative to the housing. The labyrinth seal construction comprises a first annular member tightly and coaxially disposed on the shaft, a second annular member spacedly but coaxially disposed about the first annular member and secured to the housing, a sleeve member coaxially disposed in a cylindrical gap defined between the first and second annular members, the sleeve member being connected to one of the first and second annular members, a plurality of annular projections formed on and along a cylindrical surface of one of the first and second annular members so that a top of each projection is directed toward a cylindrical surface of the sleeve member with a given annular clearance between the top of each projections and the cylindrical surface of the sleeve member, and means for permitting at least a portion of the sleeve member to be resiliently deformed in a radial direction when the tops of the projections collide against the cylindrical surface of the sleeve members, originating from occurrence of radial displacement of the shaft relative to the housing upon rotation of the shaft.

OBJECTS OF THE INVENTION

It is an object of the present invention to provide an improved labyrinth seal construction which offers quite high sealing effect.

It is another object of the present invention to provide an improved labyrinth seal construction which is particularly appropriate to dual-shaft type gas turbine engines.

It is still another object of the present invention to provide an improved labyrinth seal construction which is simple in construction.

Other objects and advantages of the present invention will become clear from the following description when taken in conjunction with the accompanying drawings.

DESCRIPTION OF A DUAL-SHAFT TYPE GAS TURBINE ENGINE

Figure 1:
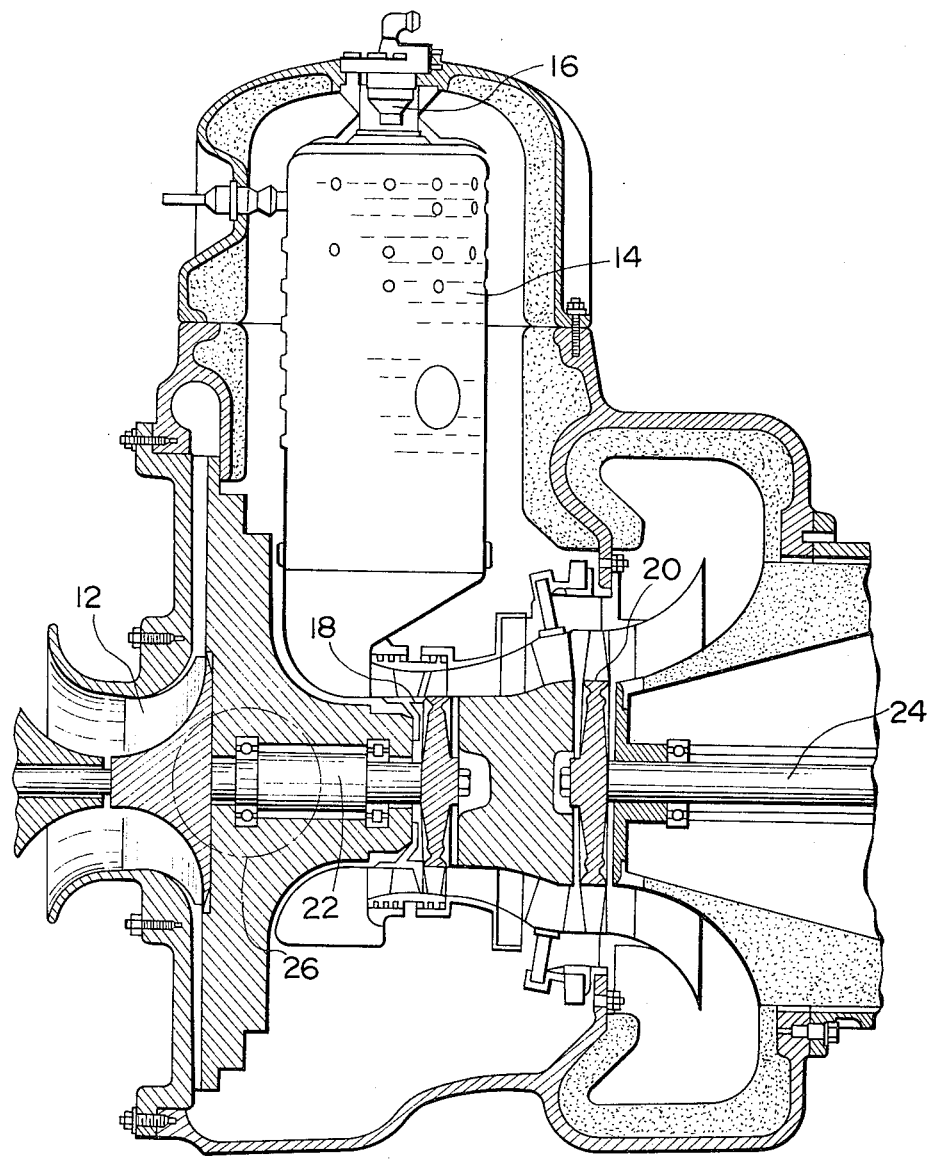
FIG. 1 is a sectional view of a dual-shaft type gas turbine engine.

Prior to describing in detail the construction of the improved labyrinth seal construction of the invention, a known dual-shaft type gas turbine engine to which the labyrinth seal construction of the invention is applicable will be outlined hereinnext with reference to FIG. 1 of the drawings.

In FIG. 1, a conventional dual-shaft type gas turbine engine is shown as being designated by numeral 10. The engine 10 hereinshown generally comprises a centrifugal compressor 12 which compresses intake air and feed the same thus compressed into a combustor 14. The compressed air is mixed in the combustor 14 with atomized fuel stream fed from fuel nozzles 16 or a fuel nozzle for combustion of the fuel. Some of the energy of combusted fuel is converted into work to rotate both a compressor turbine 18 and a power turbine 20 by using gas thus produced as the working medium. The power applied to the compressor turbine 18 is delivered to the centrifugal compressor 12 via a rotating shaft 22, while the power applied to the power turbine 20 is delivered to an output mechanism (not shown) via an output shaft 24.

In the dual-shaft type gas turbine engine 10 outlined above, a labyrinth seal construction is commonly used at sections where the rotating shafts 22 and 24 are rotatably supported for sealing those sections.

Explanation of a conventional labyrinth seal construction used at a section enclosed by a circle 26 in FIG. 1 will be made hereinnext with reference to FIG. 2.

Figure 2:
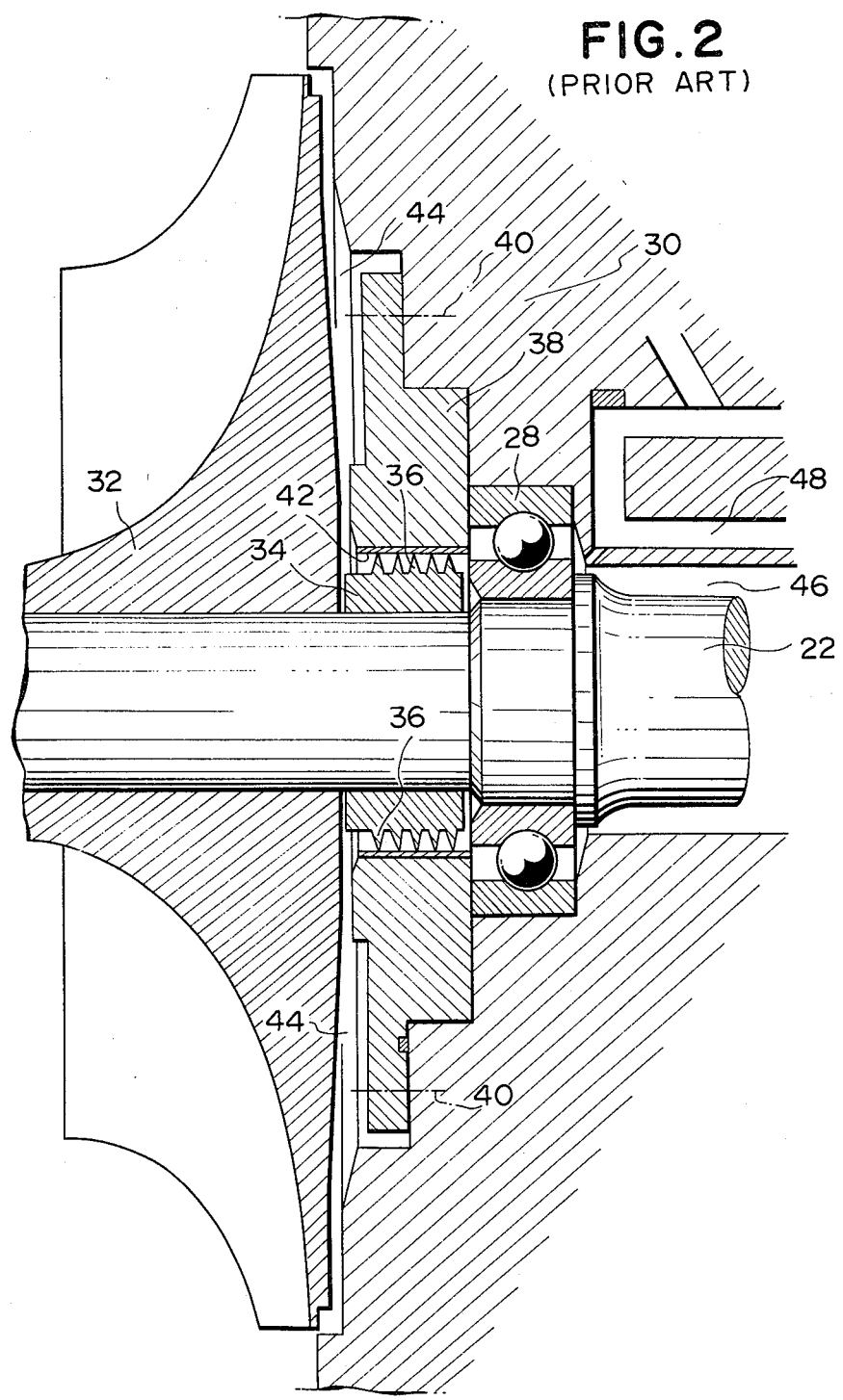
FIG. 2 is a sectional view of a conventional labyrinth seal construction usable in the engine of FIG. 1.

Referring to FIG. 2, there is shown an enlarged sectional view of the circle-enclosed section 26. The shaft 22 is rotatably supported at a portion thereof by a ball bearing 28 which is set in a housing 30. Designated by numeral 32 is an impeller of the centrifugal compressor 12 which is securedly mounted on the shaft 22 to be rotatable therewith.

The conventional labyrinth seal construction used comprises an inner metal ring 34 which is tightly and coaxially disposed on the shaft 22 at a section between the ball bearing 28 and the impeller 32. The inner metal ring 34 is formed along its cylindrical outer surface with a plurality of axially spaced annular projections or ridges 36 which are coaxial with the shaft 22. Spacedly but coaxially mounted about the inner metal ring 34 is an outer metal ring 38 which is fixed to the housing 30 by bolts (not shown) arranged at sections indicated by phantom lines 40. A sleeve 42 constructed of a wear-resisting material such as a hard carbon is coaxially and securedly disposed on the inner cylindrical surface of the outer metal ring 38. Although not well shown, the sleeve 42 is such arranged that under halt condition of the shaft 22, a certain clearance or gap is defined between the inner cylindrical surface of the sleeve 42 and the top of each annular projection 36 of the inner metal ring 34.

With the above-stated construction, the sealing function is offered as follows. When a part of compressed air in the compressor 12 reaches a space 44 defined between the back side of the impeller 32 and the front face of the outer metal ring 38 and attacks an annular space or gap defined between the sleeve 42 and the inner metal ring 34, the compressed air thus attacking the space is subjected to a pressure drop upon passage thereof through the space and finally the pressure of the attacking air is reduced to the atmospheric level at least at a zone near the ball bearing 28. This phenomenon prevents leakage of the compressed air into an open space 46 defined about the rotating shaft 22 or into a fluid passage 48 formed in the housing 30.

However, in the above-mentioned conventional labyrinth seal construction, the next-mentioned troubles or problems sometimes occur, originating from its inherent construction in which connection of the inner metal ring 34 to the shaft 22 and connection of the sleeve 42 to the outer metal ring 38 are made securely or unmovably. In fact, radial vibrations of the rotating shaft 22 occuring upon rotation thereof sometimes cause violent collisions of the annular projections 30 of the inner metal ring 34 against the cylindrical inner surface of the sleeve 42, resulting in breakage of the tops of the projections 36 and/or formation of deep streaks on the inner surface of the sleeve 42. These phenomena will lower the sealing function.

It is thus an essential object of the present invention to provide an improved labyrinth seal construction which is free of the above-mentioned drawbacks.

DESCRIPTION OF THE EMBODIMENTS

The following description is directed to four preferred embodiments of the invention in which detailed explanation of substantially the same parts as those of the conventional labyrinth seal construction of FIG. 2 will be omitted. In FIGS. 3 to 6 of respective embodiments, the substantially same parts are denoted by the same numerals as in FIG. 2.

Figure 3:
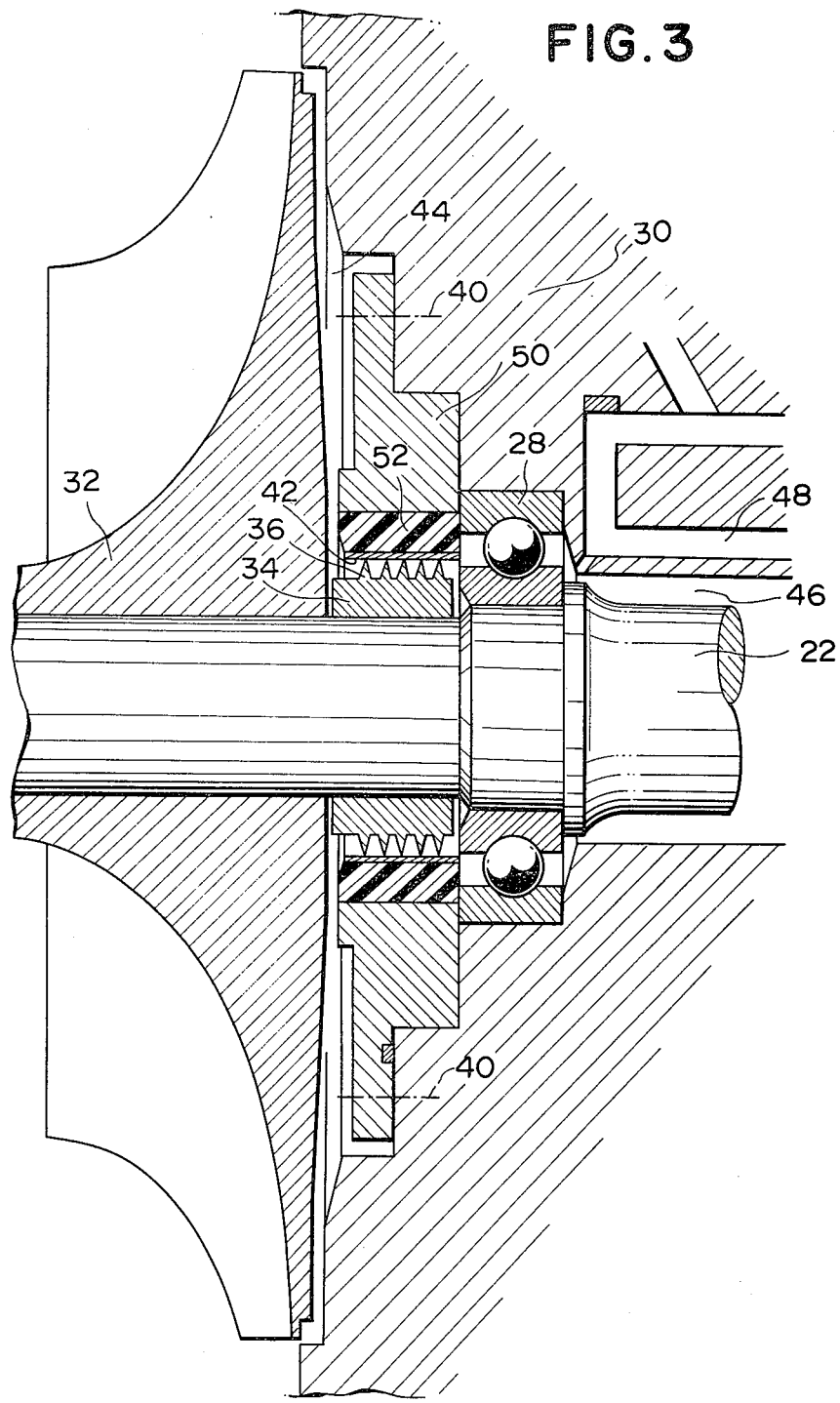
FIG. 3 is a view similar to FIG. 2, but shows a first preferred embodiment of the present invention.

Referring to FIG. 3 of the drawings, there is shown the first preferred embodiment. Similarly to the conventional one mentioned above, the inner metal ring 34 is tightly and coaxially disposed on the rotating shaft 22 at a section between the ball bearing 28 and the impeller 32. An outer metal ring 50 having an inner diameter considerably greater than that of the outer metal ring 38 of FIG. 2 is spacedly but coaxially disposed about the inner metal ring 34 and is secured to the housing 30 by bolts 40. A cylindrical elastic member 52 made of for example heat resisting rubber is securedly and coaxially disposed on the cylindrical inner surface of the outer metal ring 50. If desired, the cylindrical elastic member 52 may be fused onto the surface of the ring 50 by applying heat to the surface of the same. The sleeve 42 of a wear-resisting material is tightly and coaxially disposed on the inner cylindrical surface of the cylindrical elastic member 52. Similarly to the case of FIG. 2, the sleeve 42 is so arranged that under halt of rotating shaft 22, a certain but slight space or gap is defined between the top of each annular projection 36 of the inner metal ring 34 and the inner cylindrical surface of the sleeve 42.

According to the above-mentioned construction, the undesired breakage of the annular projections 36 and/or the formation of deep streaks on the inner surface of the sleeve 42 do not occur even when the tops of the annular projections 36 violently collide against the sleeve 42. This is because upon collision of them, the portion of the sleeve 42 against which the projections 36 collide is recoverably displaced in a radial direction, compressing a corresponding part of the elastic cylindrical member 52.

Figure 4:
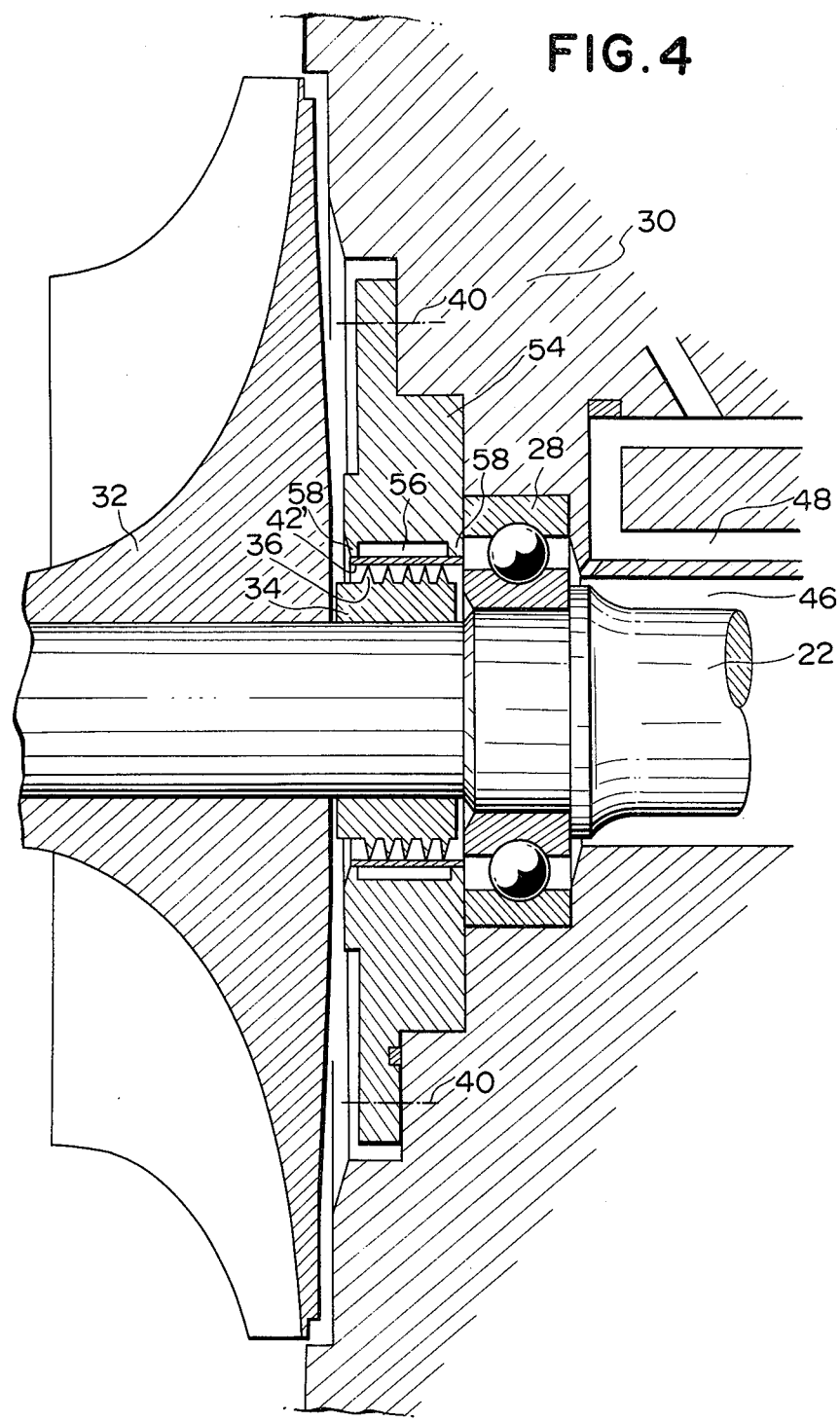
FIGS. 4, 5 and 6 are views also similar to FIG. 2, but show second, third and fourth preferred embodiments of the present invention.

Referring to FIG. 4, the second preferred embodiment is shown. The labyrinth seal construction of this embodiment comprises the inner metal ring 34 securedly disposed on the shaft 22. An outer metal ring 54 having along its inner cylindrical surface an annular groove 56 defined by two annular side banks 58 is spacedly and coaxially mounted about the inner metal ring 34 and secured to the housing 30 by bolts 40. As shown, the groove 56 is wide enough to cover all the annular projections 36 of the ring 34. A sleeve 42' constructed of resilient metal such as a stainless steel is securedly and coaxially disposed on the banks 58 to enclose the groove 56. Similarly to the afore-mentioned cases, the sleeve 42' is such arranged that under halt of the shaft 22, a certain but slight clearance is formed between the inner cylindrical surface of the sleeve 42' and the top of each annular projection 36 of the metal ring 34.

With this construction, the troubles encountered in the conventional labyrinth seal construction of FIG. 2 do not occur because upon collision of the projections 36 against the sleeve 42', the portion of the sleeve against which the projections 36 actually collide is resiliently and recoverably deformed thereby to absorb the shock applied by the projections.

Figure 5:
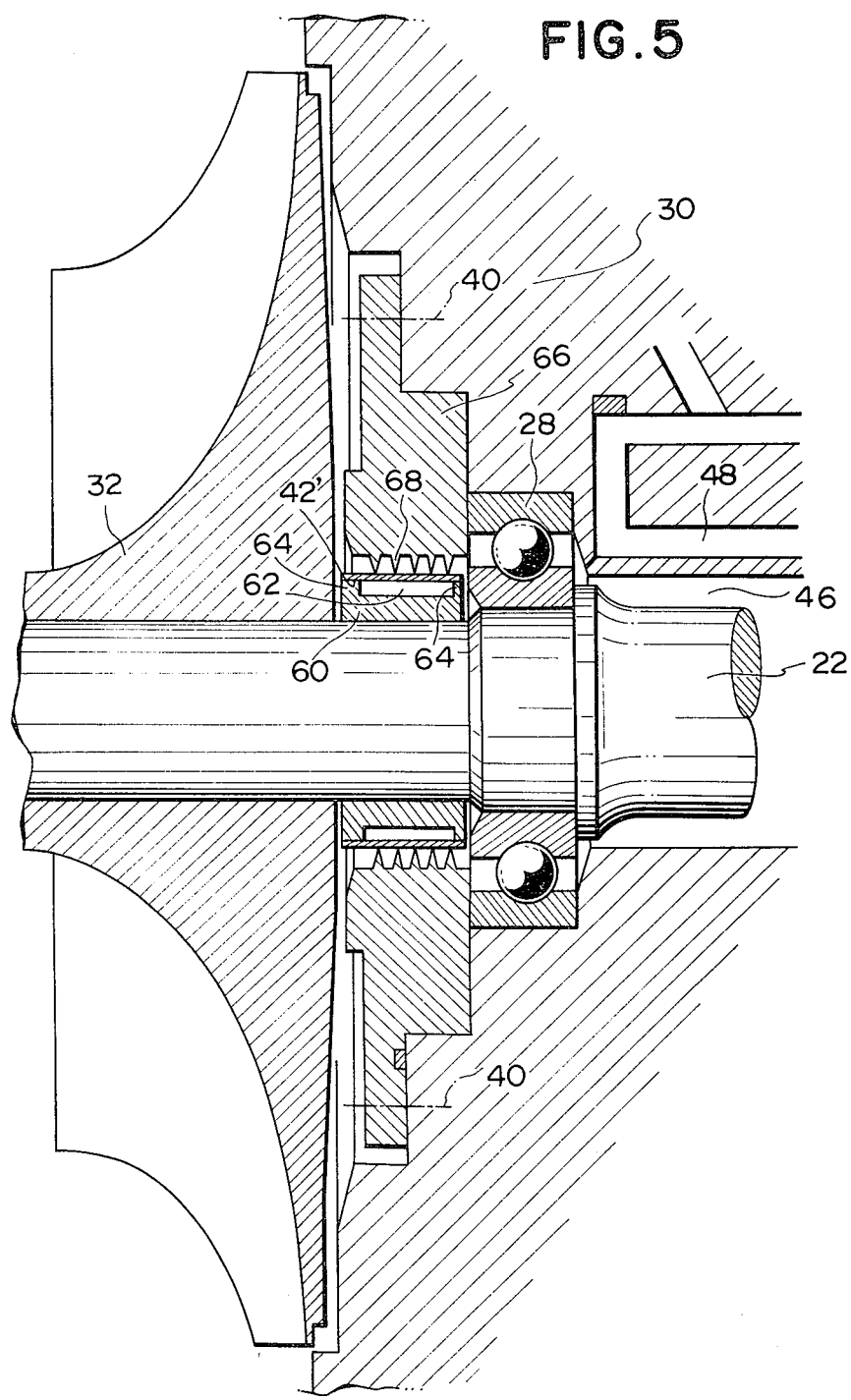

Referring to FIG. 5, the third embodiment is shown. The labyrinth seal construction of this embodiment is constructed to be a reversed form of the second embodiment of FIG. 4. An inner metal ring 60 is tightly disposed about the shaft 22. The ring 60 is formed along its outer cylindrical surface with an annular groove 62 which is defined by two side banks 64. A sleeve 42' constructed of the same material as the sleeve 42' of the second embodiment is coaxially and securedly disposed on the banks 64 to enclose the groove 62, as shown. An outer metal ring 66 having along its inner cylindrical surface a plurality of annular projections 68 is spacedly and coaxially disposed about the sleeve 42' and is secured to the housing 30 by bolts 40. Also in this embodiment, the ring 66 in such arranged that upon halt of the shaft 22, a certain but slight space or clearance is formed between the top of each annular projection 68 and the outer cylindrical surface of the sleeve 42'.

With the above-described construction, it will be appreciated that the troubles of the conventional labyrinth seal construction do not occur because radially inwardly deformation of a portion of the sleeve 42 occuring upon collision of the annular projections 68 against the sleeve 42' will absorb the shock of the collision.

Figure 6:
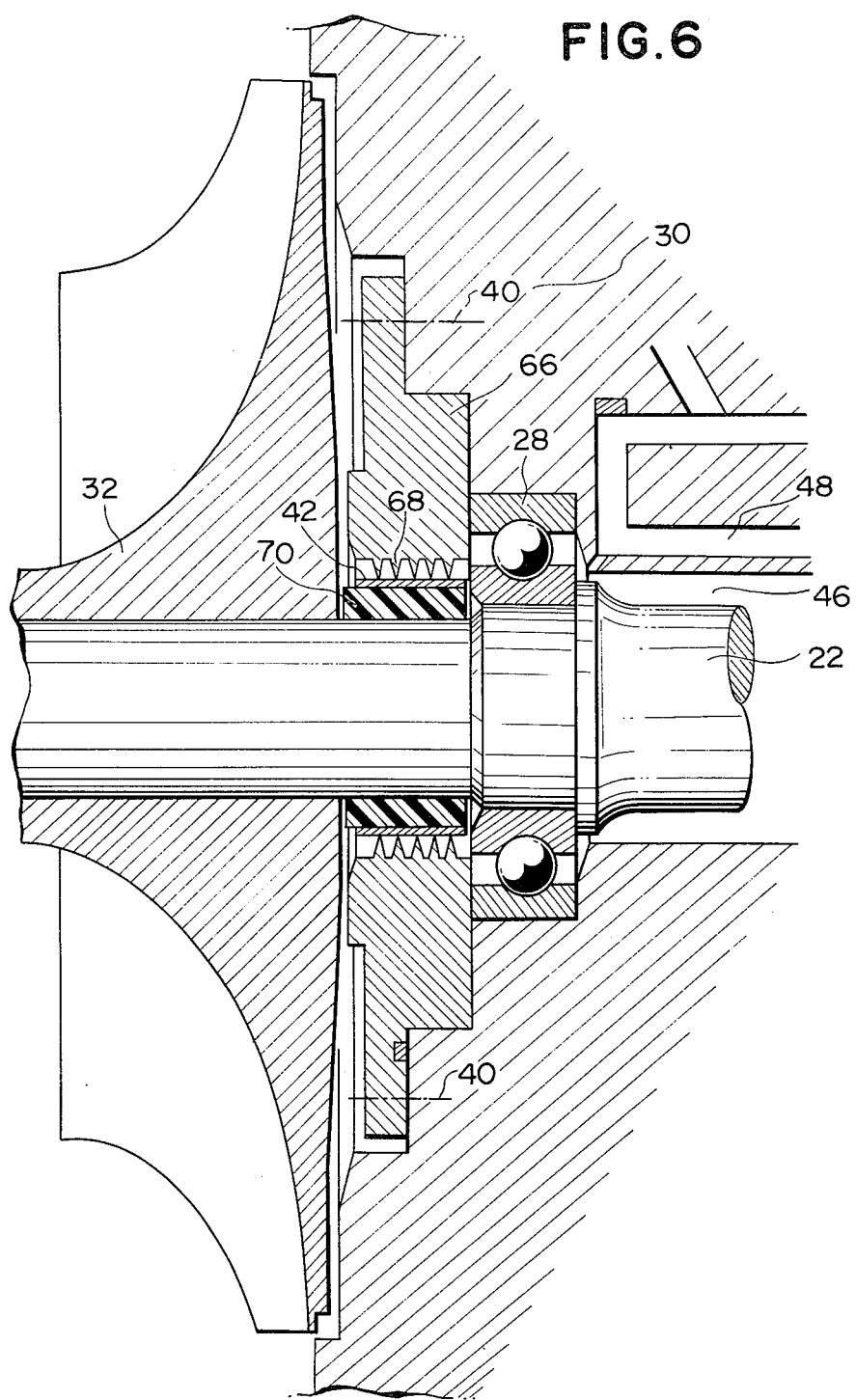

Referring to FIG. 6, the fourth embodiment is shown which has a generally reversed form of the first embodiment of FIG. 3. A cylindrical elastic member 70 constructed of the same material as the member 52 of the first embodiment is securedly and coaxially disposed on the shaft 22 at a section between the ball bearing 28 and the impeller 32. Similarly to the case of the first embodiment, the fixing of the member 70 to the shaft 22 may be made by fusing the inner cylindrical surface of the member 70. A sleeve 42 is coaxially and securedly disposed on the outer cylindrical surface of the elastic member 70. An outer metal ring 66 having along its inner cylindrical surface a plurality of annular projections 68 is disposed coaxially about the sleeve 42 and is secured to the housing 30 by bolts 40. The outer metal ring 66 is so arranged that under halt of the shaft 22, a certain but slight clearance is formed between the top of each annular projection 68 and the outer cylindrical surface of the sleeve 42.

It will be appreciated that upon collision of the projections 68 against the sleeve 42, the portion of the sleeve 42 against which the projections 68 actually collide is radially inwardly deformed while compressing the corresponding portion of the elastic member 70 thereby absorbing the shock of the collision. Thus, the undesired breakage of the projections 68 and the formation of deep streaks on the outer cylindrical surface of the sleeve 42 do not occur.

What is claimed is:

1. A labyrinth seal construction arranged in a device having a housing and a rotatable shaft which is rotatable about its axis relative to said housing, said labyrinth seal construction comprising:

a first annular metal member spacedly and coaxially disposed about said rotatable shaft and secured to said housing;

a second annular metal member coaxially and securely disposed on said rotatable shaft to define an annular gap between the inner cylindrical surface of said first annular metal member and the outer cylindrical surface of said second annular metal member, one of said first and second annular metal members being formed at the cylindrical surface facing toward the annular gap with an annular groove leaving two spaced annular side banks by which said annular groove is defined, said annular groove being coaxial with the rotatable shaft;

a resilient metal sleeve consisting of a single plate having a width sufficient to span said spaced side banks of the grooved metal member and being coaxially and securely disposed on the tops of said side banks so as to enclose said annular groove; and a plurality of annular projections formed on the cylindrical surface of the other one of said first and second annular metal members to project toward the cylindrical surface of said resilient metal sleeve so that upon rotation of said rotatable shaft, relative rotation between said annular projections and said resilient metal sleeve occurs with tops of said annular projections directed toward the cylindrical surface of said resilient metal sleeve to provide a labyrinth seal effect therebetween.

2. A labyrinth seal construction as claimed in claim 1, in which said annular groove is constructed to be wide enough to cover all the annular projections.

3. A labyrinth seal construction as claimed in claim 1, in which said resilient metal sleeve is constructed of a stainless steel.

* * * * *